US012665679B2

(12) United States Patent
Szczerban

(10) Patent No.: US 12,665,679 B2
(45) Date of Patent: Jun. 23, 2026

(54) FIBER SENSING CONTROL DEVICE

(71) Applicant: Nokia Solutions and Networks Oy, Espoo (FI)

(72) Inventor: Mijail Szczerban, Murray Hill, NJ (US)

( * ) Notice: Subject to any disclaimer, the term of this patent is extended or adjusted under 35 U.S.C. 154(b) by 249 days.

(21) Appl. No.: 18/241,933

(22) Filed: Sep. 4, 2023

(65) Prior Publication Data

US 2025/0080241 A1    Mar. 6, 2025

(51) Int. Cl.
H04B 10/85 (2013.01)
H04B 10/079 (2013.01)
H04B 10/25 (2013.01)

(52) U.S. Cl.
CPC ........... H04B 10/85 (2013.01); H04B 10/079 (2013.01); H04B 10/25 (2013.01)

(58) Field of Classification Search
CPC ......... H04B 10/85; H04B 10/79; H04B 10/25
USPC .......................................................... 398/40
See application file for complete search history.

(56) References Cited

U.S. PATENT DOCUMENTS

| | | | | | |
|---|---|---|---|---|---|
| 6,576,886 | B1 * | 6/2003 | Yao | ........................ | G02F 1/0136 |
| | | | | | 250/225 |
| 11,668,590 | B2 * | 6/2023 | Xie | ........................ | H04B 10/27 |
| | | | | | 250/227.17 |
| 12,051,309 | B2 * | 7/2024 | Huang | ................. | G08B 13/186 |
| 2018/0058982 | A1 * | 3/2018 | Hartog | .................... | G01H 9/004 |
| 2018/0058985 | A1 * | 3/2018 | Luce | ..................... | G01M 17/04 |
| 2020/0313763 | A1 * | 10/2020 | Wang | .............. | H04B 10/25753 |

| | | | | |
|---|---|---|---|---|
| 2021/0010836 | A1 | 1/2021 | Hino et al. | |
| 2021/0360029 | A1 | 11/2021 | Huang et al. | |
| 2022/0247562 | A1 | 8/2022 | Wang et al. | |
| 2022/0417672 | A1 * | 12/2022 | Djukic | ................. H04B 10/532 |
| 2023/0075118 | A1 | 3/2023 | Yano | |

FOREIGN PATENT DOCUMENTS

| | | | | |
|---|---|---|---|---|
| CA | 3067864 | A1 * | 2/2019 | ........... E21B 47/135 |
| WO | WO-2022136832 | A1 * | 6/2022 | ......... G01D 5/35361 |

OTHER PUBLICATIONS

Szczerban et al; Real-time Optical Network Sensing Control Plane Enabled by a Novel Sub-µs Response Time Fibre Sensing Control Device—Oct. 2023, Nokia bell labs, pp. 1-4. (Year: 2023).*
Szczerban; Real-time Optical Network Sensing Control Plane Enabled by a Novel Sub-µs Response Time Fibre Sensing Control Device; Oct. 2023, Nokia bell labs, pp. 1-4. (Year: 2023).*
Liu et al; Distributed Fiber-Optic Sensors for Vibration Detection, Jul. 2016, MDPI, pp. 1-31. (Year: 2016).*
Dahan, David et al., "Security Threats and Protection Procedures for Optical Networks", IET Optoelectron, 2017, vol. 11, Issue 5, pp. 186-200.

* cited by examiner

*Primary Examiner* — Amritbir K Sandhu
(74) *Attorney, Agent, or Firm* — Capitol Patent & Trademark Law Firm, PLLC

(57)    ABSTRACT

A fiber sensing control device (FSCD) is provided for protecting a network infrastructure in an optical fiber network against intrusive fiber sensing. The FSCD resides on an optical fiber cable at a boundary between the first network segment containing the network infrastructure that is to be protected and a neighboring network segment. The FSCD comprises at least one blocking element that can block sensing of backscattered light on at least one optical fiber of the optical fiber cable.

20 Claims, 6 Drawing Sheets

FIBER SENSING CONTROL DEVICE

TECHNICAL FIELD

The disclosure relates to methods and apparatus for the operation and control of fiber-optic communication networks, and more particularly to optical fiber sensing in fiber-optic communication networks and to related security measures.

ART BACKGROUND

Optical fiber sensing is useful in the operation of fiber-optic communication networks, not least because it can detect precursors of some events that may interfere with optical transmission. For instance, fiber-break precursors may be detectable by tracking the state-of-polarization (SoP). In other examples, Backscattering (BS) light-sensing systems such as Optical Time Domain Reflectometry (OTDR) and Distributed Acoustic Sensing (DAS) are known methods for probing a fiber network. These techniques can provide details not only about the fiber-network topology, but also about mechanical events that occur in the proximity of the probed fiber network. New applications are still emerging for fiber sensing, which can provide information that is valuable for network design, optimization, and operations.

The power of fiber-sensing techniques also makes them attractive to malicious actors. For example, an unauthorized party could sense the passive network by these techniques in order to obtain proprietary information about the network infrastructure or to determine, e.g., the number of subscribers connected to a PON system. DAS could potentially be used to eavesdrop on spoken conversations occurring in the proximity of exposed fiber. For these and other reasons, network owners and operators have a need for control over where, when and how fiber sensing may occur in the affected network.

SUMMARY OF THE DISCLOSURE

Disclosed here are a fiber-sensing control device (FSCD) and associated sensing control plane that can afford control, to authorized parties, over where, when, and how fiber sensing can be applied in an optical fiber network.

Accordingly, the present disclosure relates in a first aspect to a system comprising one or more network segments. At least a first one of the network segments comprises a network infrastructure, at least one optical fiber cable communicatively connected to the network infrastructure, and one or more fiber sensing control devices (FSCDs) for control of fiber sensing of the first network segment. Each of the FSCDs is located on a respective one of the optical fiber cables at a boundary between the first network segment and a neighboring network segment. Each of the FSCDs is dedicated for the purpose of controlling fiber sensing on at least one fiber of its respective optical fiber cable. Each of the FSCDs comprises at least one blocking element that is controllable to block sensing of backscattered light on at least one fiber under control of the FSCD.

In embodiments, at least one of the blocking elements comprises an optical isolator.

In embodiments, at least the first one of the FSCDs further comprises an SoP unit comprising a polarization scrambler on at least one fiber under control of the FSCD.

In embodiments, at least one of the FSCDs comprises a local control unit for activating and deactivating its at least one blocking element.

In embodiments, at least a first one of the FSCDs comprises, on each fiber under its control, a pass-through path for communication signals, a bypass path for backscattered signals, and an optical gate for controllably allowing and blocking the backscattered signals. In more specific embodiments, at least the first one of the FSCDs further comprises a local control unit for opening and closing the optical gate, and a diversion path for diverting, to the local control unit, a portion of communication signals that enter the FSCD.

In embodiments, the local control unit is configured to detect a command signal in the diverted signal portion, and to respond to the command signal by activating the optical gate to open or close.

In embodiments, the local control unit is configured to detect a signal pattern indicative of an intrusion attempt in the diverted signal portion, and to respond to the detected pattern by activating the optical gate to close.

In embodiments, at least the first one of the FSCDs further comprises a real-time sensing agent, the real-time sensing agent is configured to detect intrusion attempts, and to respond to a detected intrusion attempt by sending an activation signal to the controller.

In embodiments, the FSCD further comprises an SoP unit comprising a polarization scrambler and a controller for the polarization scrambler on at least one fiber under control of the FSCD, and the real-time sensing agent is further configured to respond to a detected intrusion attempt by sending an activation signal to the controller of the SoP unit to activate the polarization scrambler.

In embodiments, the system comprises a plurality of network segments, each of which is protected by one or more FSCDs that collectively constitute an FSCD plurality. Each FSCD of the FSCD plurality controls fiber sensing on at least one fiber of a respective optical fiber cable. Each FSCD of the FSCD plurality comprises, on each fiber under its control, a pass-through path for communication signals, a bypass path for backscattered signals; and at least one optical gate for controllably allowing and blocking the backscattered signals. Each FSCD of the FSCD plurality further comprises a local control unit for opening and closing its respective at least one optical gate. Each of the network segments of the network-segment plurality further comprises a sensing network controller configured to send control signals to the respective local control units of the FSCDs belonging to that network segment.

In embodiments, the system further comprises a sensing network orchestrator communicatively connected to the sensing network controller of each of the network segments of the network-segment plurality. The sensing network orchestrator is configured to orchestrate control of the FSCDs across the plurality of network segments. Each sensing network controller is configured to send control signals to the respective local control units of the FSCDs belonging to its respective network segment in response to orchestration signals that it receives from the sensing network orchestrator.

In a second aspect, the present disclosure relates to a method of permissively controlling fiber sensing of a network infrastructure situated within at least a first network segment of a communication network. The method comprises activating at least one fiber-sensing control device (FSCD) located on a respective optical fiber cable at a boundary between the first network segment and a neighboring network segment. The at least one FSCD is dedicated for the purpose of controlling fiber sensing on one or more fibers of its respective optical fiber cable. The activating of the at least one FSCD comprises causing each of one or more blocking elements to block sensing of backscattered light on one or more fibers under control of the at least one FSCD.

In embodiments, the activating of the at least one FSCD comprises activating an optical isolator.

In embodiments, the activating of the at least one FSCD further comprises activating a polarization scrambler on one or more fibers under control of the FSCD.

In embodiments, the activating of the at least one FSCD comprises causing an optical gate to close so as to block backscattered signals from entering one or more fibers under control of said FSCD.

In embodiments, the method further comprises diverting at least a portion of communication signals entering the at least first one of the FSCDs to a local control unit configured to detect a command signal in the diverted signal portion, and the causing of an optical gate to close is performed in response to detection of a command signal in the diverted signal portion.

In embodiments, the method further comprises diverting at least a portion of communication signals entering the at least first one of the FSCDs to a local control unit configured to detect a signal pattern indicative of an intrusion attempt in the diverted signal portion, and the causing of an optical gate to close is performed in response to detection of a signal pattern indicative of an intrusion attempt in the diverted signal portion.

In embodiments, the method further comprises activating a polarization scrambler on one or more fibers under control of the at least one FSCD in response to detection of a signal pattern indicative of an intrusion attempt in the diverted signal portion.

In embodiments, the communication network comprises a plurality of network segments each of which is protected by one or more FSCDs that collectively constitute an FSCD plurality, each FSCD of the FSCD plurality controls fiber sensing on at least one fiber of a respective optical fiber cable, each FSCD of the FSCD plurality comprises a local control unit for activating and deactivating its respective at least one blocking element, and each of the network segments of the network-segment plurality further comprises a sensing network controller configured to send control signals to the respective local control units of the FSCDs belonging to that network segment.

In such embodiments, the activating of the at least one FSCD comprises sending one or more first control signals from a sensing network orchestrator, and sending one or more second control signals from at least one sensing network controller. The first control signals are sent from the sensing network orchestrator to the sensing network controllers of selected networks, and the second control signals are sent by the sensing network controllers of the selected networks in response to the first control signals. Each second control signal is sent by a sensing network controller to the local control unit of each of one or more FSCDs within the sensing network controller's own network segment; and each local control unit responds to a received second control signal by activating a respective blocking element.

DETAILED DESCRIPTION

Figure 1:
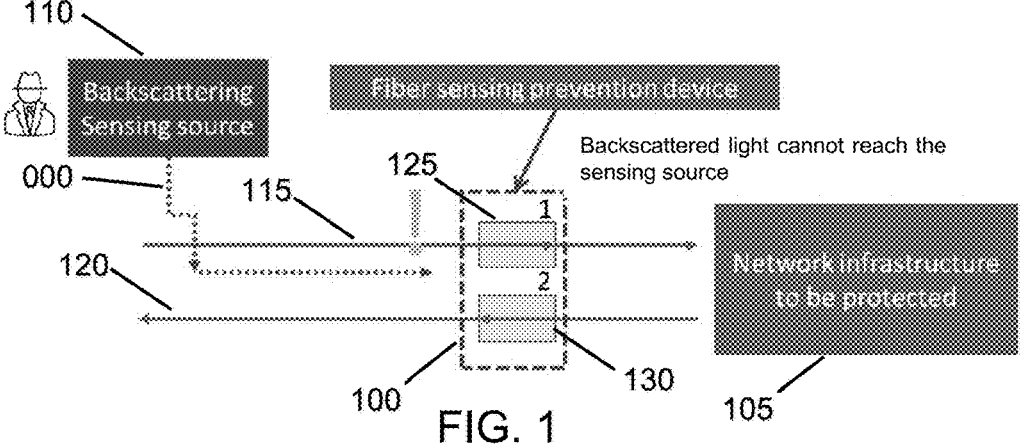
FIG. 1 is a simplified block diagram showing an illustrative scenario in which a Fiber Sensing Control Device (FSCD), in an example embodiment, is protecting a network infrastructure.

FIG. 1 is a simplified block diagram showing an illustrative scenario in which Fiber Sensing Control Device (FSCD) 100, in an example embodiment, is protecting network infrastructure 105.

It is noteworthy that device 100 is dedicated specifically for the function of protecting the network infrastructure.

An FSCD device as illustrated, e.g., in FIG. 1 could be used to disable backscattering-based sensing of various kinds, including, without limitation, OTDR sensing and DAS sensing. In other embodiments, as will be discussed below, an FSCD device can be used for control, i.e., for both enabling and disabling, backscattering-based sensing or other types of fiber sensing.

It is noteworthy that FSCD device 100 includes an element 125 on forward fiber 115, i.e., on the fiber whose propagation direction is toward infrastructure 105, and also an element 130 on return fiber 120, i.e., on the fiber whose propagation direction is away from the infrastructure 105.

Generally, implementation in both fibers will be necessary for effective protection, although in some cases there may be only one fiber to protect, or one propagation direction may be secure for other reasons and not in need of protection by an FSCD device.

In several of the examples below, implementation on only one fiber is illustrated explicitly, for simplicity of presentation. However, it should be understood that typically, a corresponding unit would also be implemented on the oppositely propagating fiber.

It should also be understood that although the examples given here refer to one fiber per propagation direction, this is merely representative of the more general case in which there are one or more fibers per propagation direction.

It should also be understood that an FSCD device may operate individually on a single fiber, it may operate jointly on a plurality of co-propagating fibers, or it may operate jointly on a plurality of fibers that includes one or more fibers that propagate in each of the two directions.

In the illustrative scenario of FIG. 1, an unauthorized party transmits a probe signal into the network from BS sensing source 110. As illustrated, the network has a forward-directed fiber 115 and a return fiber 120. As noted above, the terms "forward" and "return" are used here only for convenience in referring, respectively, to the direction of customer signals or the like that are transmitted toward and away from the network infrastructure 105 that is to be protected.

In the nonlimiting example of FIG. 1, FSCD 100 includes an optical isolator 125 on forward fiber 115 that permits propagation only in the forward direction, and an optical isolator 130 on fiber 120 that permits propagation only in the return direction. (The term "only" in this regard means that propagation in the prohibited direction, if any, is too low to be of practical value.)

In typical scenarios involving bidirectional fiber, the forward fiber is physically separated from the return fiber. Consequently, the intruder would need both propagation directions to be enabled in the fiber that it is trying to monitor.

An intrusion attempt may be co-propagating or back-propagating. In a co-propagating attempt, a probe pulse is launched in the forward direction from BS sensing source 110 onto forward fiber 115. This attempt will be unsuccessful because the light backscattered from infrastructure 105 that returns on fiber 115 will be blocked by optical isolator 125 from reaching the point of intrusion. In a back-propagating attempt, the probe pulse is launched in the forward direction from BS sensing source 110 onto return fiber 120. This attempt will be unsuccessful because the probe pulse will be blocked by optical isolator 130 from reaching infrastructure 105. Consequently, no backscattering sensing can be performed from outside the protected network infrastructure through the protected fibers.

Optical isolators that would be useful in the context of FIG. 1 are known and need not be described here in detail. By way of example, erbium-doped fiber amplifiers (EDFAs) commonly implement optical isolators. An EDFA that implements an optical isolator could be used to provide the isolator functionality. When used to provide the isolator functionality, such an EDFA could be placed in a specific location to control sensing activities, even if the attenuation or other characteristic of the communication system does not require amplification at that location. The choice of an EDFA could be advantageous, because EDFAs are already commonly used for other purposes in optical fiber networks.

Although the use of isolators is well known in fiber-optic networks, the placement of an FSCD is special: Given a network segment that is designated for protection from fiber sensing, the FSCD could be placed between the designated network segment and a network segment that is vulnerable to fiber sensing. In other cases, the FSCD could be placed between the designated network segment and another network segment that has one or more FSCDs of its own, for its own protection against fiber sensing. If a designated network segment lies between two vulnerable network segments, it could be desirable to add an FSCD on each boundary of the designated segment, so that it is protected at both ends. A designated network segment that occupies a terminal position within a fiber cable would generally need to have an FSCD only on the medial boundary, and not on the terminal side. Similarly, if the designated segment faces a vulnerable network segment on one side and faces a secure network segment on the other side, it may need to have an FSCD only on the vulnerable side.

Another special feature that can be provided in an FSCD is the ability to control when the FSCD is effectively operating to isolate the protected network segment from sensing attempts.

To prevent attacks that disable or bypass the FSCD, it may be desirable to situate the FSCD in a secured premise accessible only to authorized personnel.

The FSCD of FIG. 1 will prevent an intruder from retrieving backscattered light from protected network infrastructure 105. However, it will present the same impediment to an authorized network owner or operator attempting access from outside protected network infrastructure 105 from retrieving backscattered light from protected network infrastructure 105. If fiber sensing in a specific network segment is desired for an authorized operation, the FSCD must be bypassed or disconnected.

Figure 2:
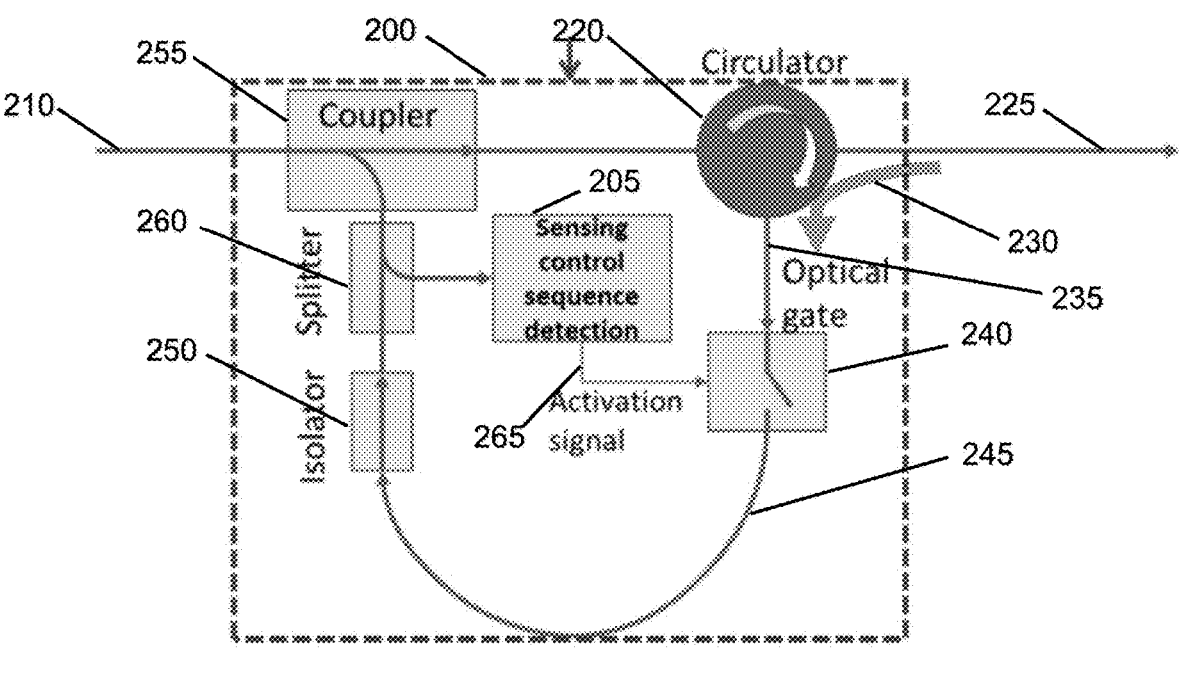
FIG. 2 is a simplified schematic diagram of an FSCD in an example embodiment that includes a control unit that allows the authorized network owner or operator to control when backscattering-based fiber sensing is permitted and when it is blocked.

FIG. 2 is a simplified schematic diagram of a second embodiment of the FSCD, shown in the figure as FSCD 200. The embodiment of FIG. 2 includes a control unit, namely sensing-control sequence detector 205, that allows the authorized network owner or operator to control when the fiber sensing is permitted and when it is blocked. Within FSCD 200, both customer signals and sensing pulses propagate in the forward direction on forward fiber 210 (which is from left to right in the view of the figure).

At circulator 220 the forward-propagating customer signals and sensing pulses pass forward and continue propagating downstream on fiber segment 225. However, back-propagating signals 230, including the backscatter from probe pulses, are circulated clockwise (in the illustrated example) by circulator 220 so that they are directed onto fiber segment 235. Control of optical gate 240 determines whether a given back-propagating signal will or will not be admitted to secondary fiber path 245.

The hardware implementation of circulator 220 should be chosen to have a bandwidth suitable for the specific application and for the wavelengths used for communication and sensing. A device with a relatively wide bandwidth may be chosen. At least, the bandwidth should encompass both customer channels and probe wavelength.

On secondary fiber path 245, optical isolator 250 ensures that only the back-propagating signal can traverse secondary fiber path 245. Optical coupler 255 couples the back-propagating signal from secondary path 245 into forward fiber 210, where it continues to propagate as a back-propagating signal. i.e., as a signal propagating from right to left in the view of the figure.

A portion of each forward-directed signal entering FSCD 200 is diverted by optical coupler 255 onto secondary path 245, toward splitter 260. Splitter 260 diverts a portion of the forward-directed signal to sensing-control sequence detector 205. As explained more fully below: activation signals generated by sequence detector 205 operate optical gate 240, to open or close it to signals that are back-propagating on secondary fiber path 245.

In non-limiting examples, coupler 255 may be a commercially available 3 dB splitter, and splitter 260 may be a commercially available splitter/combiner. Sensing-control sequence detector 205 may include a wavelength filter to select a control signal on a dedicated control wavelength for detection. Alternatively, coupler 255 could be implemented as a band splitter for selecting a dedicated control wavelength to be directed to sensing-control sequence detector 205. In another example, splitter 260 could include a band filter for selecting a dedicated control wavelength to be directed to sensing-control sequence detector 205.

In an example implementation that is not wavelength-selective, splitter 260 is a commercially available 1/99 splitter. Sensing-control sequence detector 205 is configured to detect an optical power level of the portion of the forward-directed signal that is diverted to the sensing-control sequence detector 205 by splitter 260. When. e.g., an OTDR signal is sent, the resulting power variation may trigger a decision to enable or to disable sensing.

In an example implementation that is wavelength-selective, sensing-control sequence detector 205 is configured to detect an optical power level of a selected wavelength of the portion of the forward-directed signal that is diverted to the sensing-control sequence detector 205 by splitter 260.

An important feature of the FSCD as represented, e.g., in FIG. 2, is that it can support real-time operation. That is, a control signal from, e.g., an automated control module can elicit a response that activates the optical gate with sufficient speed to counter an attack as it is happening. Preferably, such a response should occur within a one-microsecond timescale or less.

To operate sensing-control sequence detector 205, an authorized person such as a field technician transmits a specific control sequence on forward fiber 210. Detector 205 reads the control sequence. If the control sequence matches a predetermined pattern, it triggers detector 205 to generate an activation signal and transmit it on path 265 to optical gate 240. There may be different activation signals for opening the optical gate and for closing it. Path 265 may be optical or electrical, although, in embodiments, an electrical path for fast electrical signals may be preferable. In embodiments, the activation signal may, alternatively, be sent from a centralized or distributed network controller.

In an example implementation of sensing-control sequence detector 205, power detection is used to detect when OTDR sensing is being performed. The OTDR signal could be a manifestation of an actual threat, or it could be a control signal sent by the network operator. Detector 205 could also include a wavelength filter to separate the control signal, a transceiver to extract the information from the signal, and a processing/decision-making unit. The processing/decision-making unit could, among other things, discriminate between control signals and actual threats.

Figure 3:
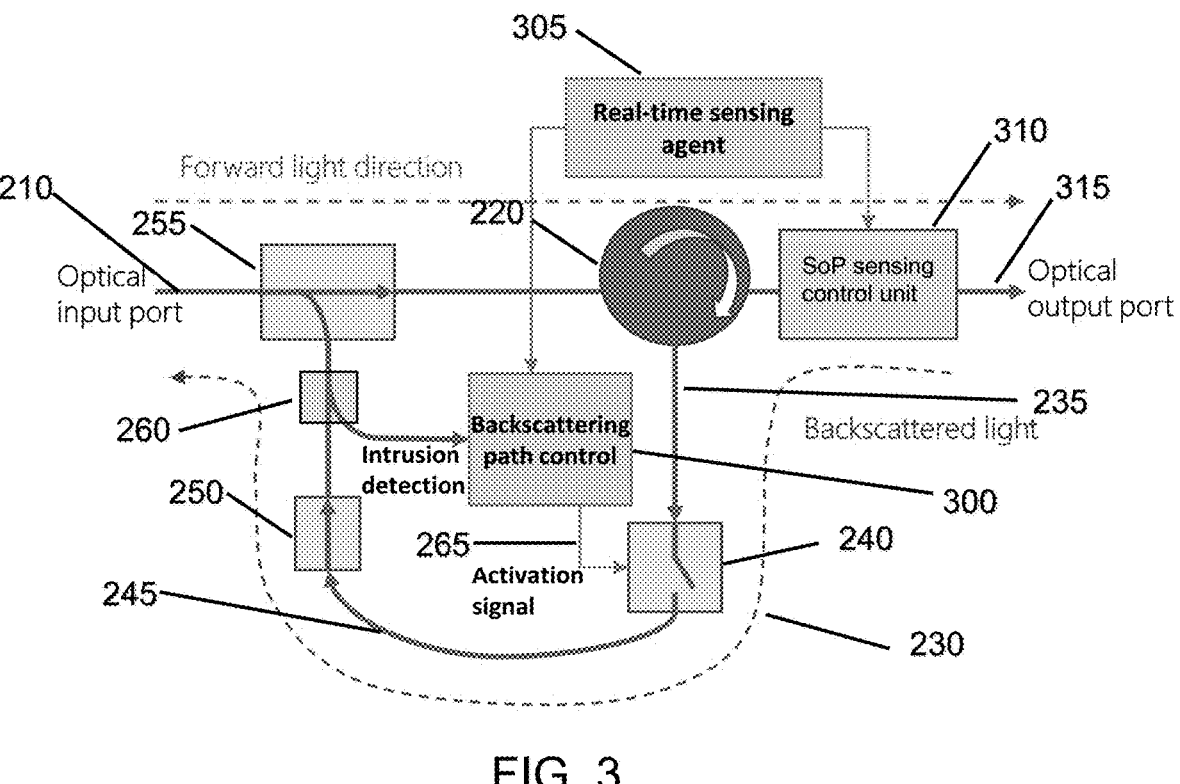
FIG. 3 is a simplified schematic diagram of an FSCD in another example embodiment that is capable of real-time operation. In the embodiment of FIG. 3, there is control not only of backscattering-based sensing, but also control of state-of-polarization sensing.

FIG. 3 is a simplified schematic diagram of a third embodiment of the FSCD that, like the embodiment of FIG. 2, is capable of real-time control. The embodiment of FIG. 3 shares elements in common with the embodiment of FIG. 2. Elements common to FIGS. 2 and 3 are designated with like reference numerals. In contrast to the embodiment of FIG. 2, the embodiment of FIG. 3 provides control not only over backscattering-based sensing, but also over methods of state-of-polarization (SoP) sensing.

The FSCD of FIG. 3 may be operated in two ways. One mode of operation is conducted through the sensing control plane. In that mode of operation, a central controller, not shown in FIG. 3, sends an instruction to real-time sensing agent 305. Agent 305 executes the instruction through backscattering path control 300 and polarization-scrambling unit 310. In the other mode of operation, a specific signal received from the line by backscattering path control 300 directly causes control 300 to activate or deactivate the backscattering sensing.

In either mode of operation, gate 240 can be maintained in a closed position until a network entity or authorized person sends a suitable control signal that instructs path control 300 to open the gate.

In at least some optical fiber networks, it may be possible to detect some intrusion events, such as the launching of an unauthorized probe pulse onto an optical fiber. In embodiments, the network may respond by launching an alarm signal on forward fiber 210. For example, detection of a power variation induced by an OTDR pulse could be the trigger for making a sensing-control decision. In another example, detection by an optical spectrum analyzer (OSA) of a signal in the fiber at an unauthorized frequency could trigger a sensing-control decision.

As noted above in reference to FIG. 2, a portion of each forward-directed signal entering the FSCD is diverted by optical coupler 255 onto secondary path 245, toward splitter 260. In the embodiment of FIG. 3, splitter 260 directs a portion of the forward-directed signal to backscattering path control unit 300. At backscattering path control unit 300, the alarm signal is detected, causing path control 300 to close optical gate 240.

As noted, the embodiments of FIG. 2 and FIG. 3 can support real-time control of sensing activities. This capability is important for network security, because an intruder could, in principle, leverage any relevant delay on the reactivity of the sensing control system to extract information from the optical fiber network. A relevant reaction time could be, e.g., the time that the network requires to detect an intrusion and to respond by disabling the sensing of backscatter. A reaction time as short as 1 millisecond could still allow the intruder to obtain a backscattered signal from a single pulse over a fiber length of 100 km. By repeating such a fast intrusion many times, the intruder could potentially obtain reliable information on the network infrastructure.

The embodiment of FIG. 3 includes state-of-polarization (SoP) sensing control unit 310. SoP control unit 310 includes a polarization scrambler and may also include control circuitry to control, e.g., the scrambling speed.

The SoP sensing control unit is an optional feature that adds further security by controlling State-of-Polarization (SoP) sensing, in addition to the control of backscattering sensing as discussed above. SoP sensing control unit 310 is placed in the forward propagation direction between circulator 220 and output port 315. To disable SoP sensing, real-time sensing agent 305 sends an electrical control signal that activates the polarization scrambler in unit 310. When active, the polarization scrambler randomly varies the state of polarization of light passing through it that is within its effective bandwidth. Accordingly, the polarization scrambler is able to eclipse certain events that could otherwise be detected through SoP tracking at the receiver side. For example, scrambling in the human auditory frequency band could be used to prevent eavesdropping on spoken conversations.

Figure 4:
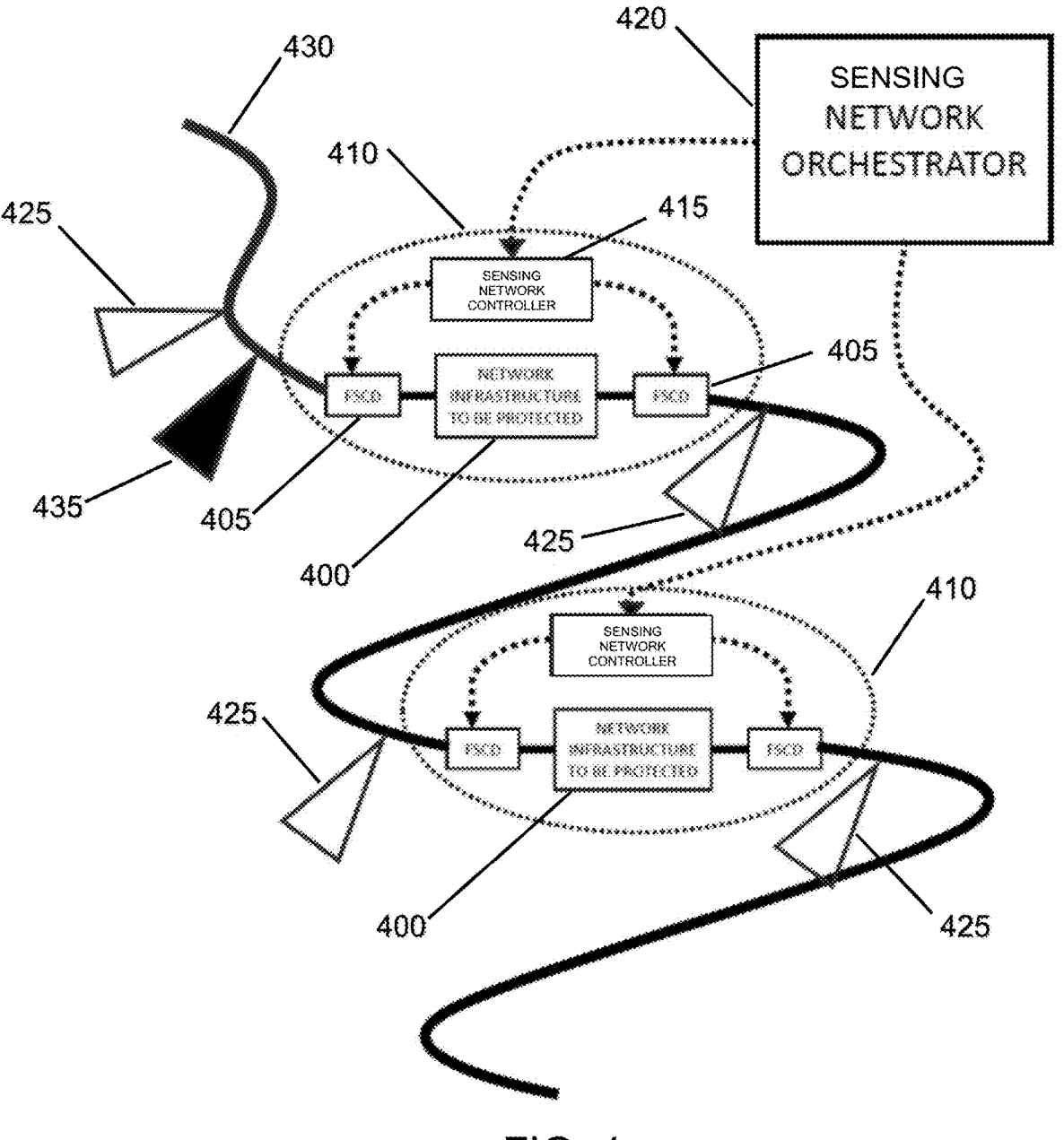
FIG. 4 is a simplified block diagram of a portion of an optical fiber network in which a network infrastructure is protected by FSCD units at each of several localities on the network.

FIG. 4 is a simplified block diagram of a portion of an optical fiber network in which a network infrastructure 400 is protected by FSCD units 405 at each of several localities 410 on the network. FSCD control in the example of FIG. 4 is managed by a sensing network control plane, which, in embodiments, may be isolated (i.e., "hard sliced") from the network communication control. In the example of FIG. 4, sensing network control is carried out by sensing network orchestrator 420 and the sensing network controllers 415.

Within each network segment 410, a respective sensing network controller 415 can perform local control of FSCDs 405 located in the sensing region by, for example, detecting intrusions or applying sensing policies established by the sensing network orchestrator. Sensing network orchestrator 420 orchestrates sensing activities across the various network segments 410.

FIG. 4 shows a plurality of authorized sensing devices 425 situated at typical locations relative to the FSCD units 405, along optical fiber cable 430. An unauthorized sensing device 435 is also represented in the figure.

Example

We implemented a prototype FSCD substantially as shown in FIG. 3, including both backscattering sensing control and SoP sensing control. A real-time sensing control plane, including the functionality of the real-time sensing agent 305 of FIG. 3, was implemented in a real-time FPGA with a response time of less than 60 ns.

Optical gate 240 of FIG. 3 was implemented in several different devices. In some trials, we used a voltage-controlled variable optical attenuator (VOA). In other trials we used an acoustic-optic modulator (AOM). Alternative implementations of the optical gate could use, by way of example and not of limitation, a semiconductor optical amplifier (SOA), a MEMS-based optical switch, or an electro-optic switch.

The prototype was configured for operation in four distinct sensing states: SoP and BS sensing enabled: SoP sensing enabled: BS sensing enabled; and no sensing enabled.

We tested the BS control using a commercially available OTDR device operating in 1550-nm and 1610-nm wavelength bands, using an optical fiber about 1.15 km in length. With BS is enabled, the length of the fiber was detectable, and the presence of a connector at the far end of the fiber was also detectable. When the FSCD was operated to disable BS sensing, the OTDR device was unable to capture information on the fiber.

Figure 5:
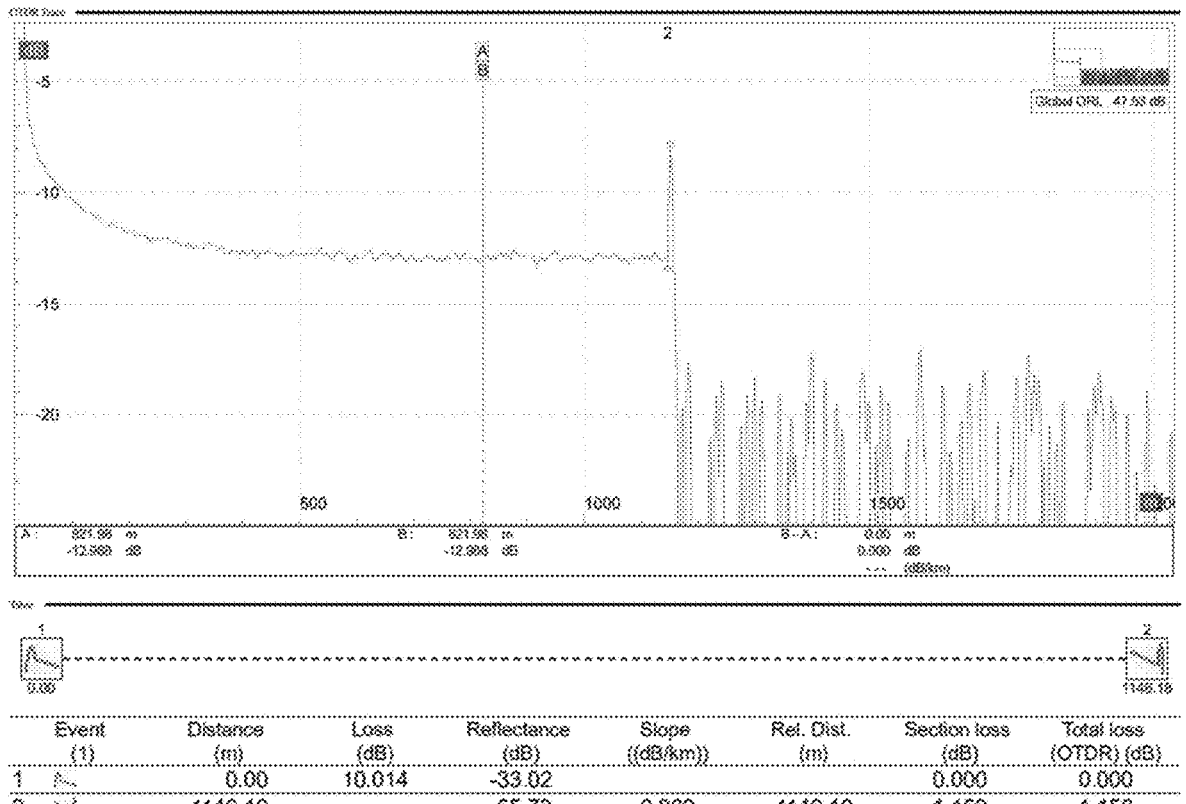
FIGS. 5 and 6 are example OTDR traces that were taken in experimental trials of a prototype FSCD. The OTDR trace of FIG. 5 was taken with backscatter sensing enabled. The OTDR trace of FIG. 6 was taken with backscatter sensing disabled.
Figure 6:
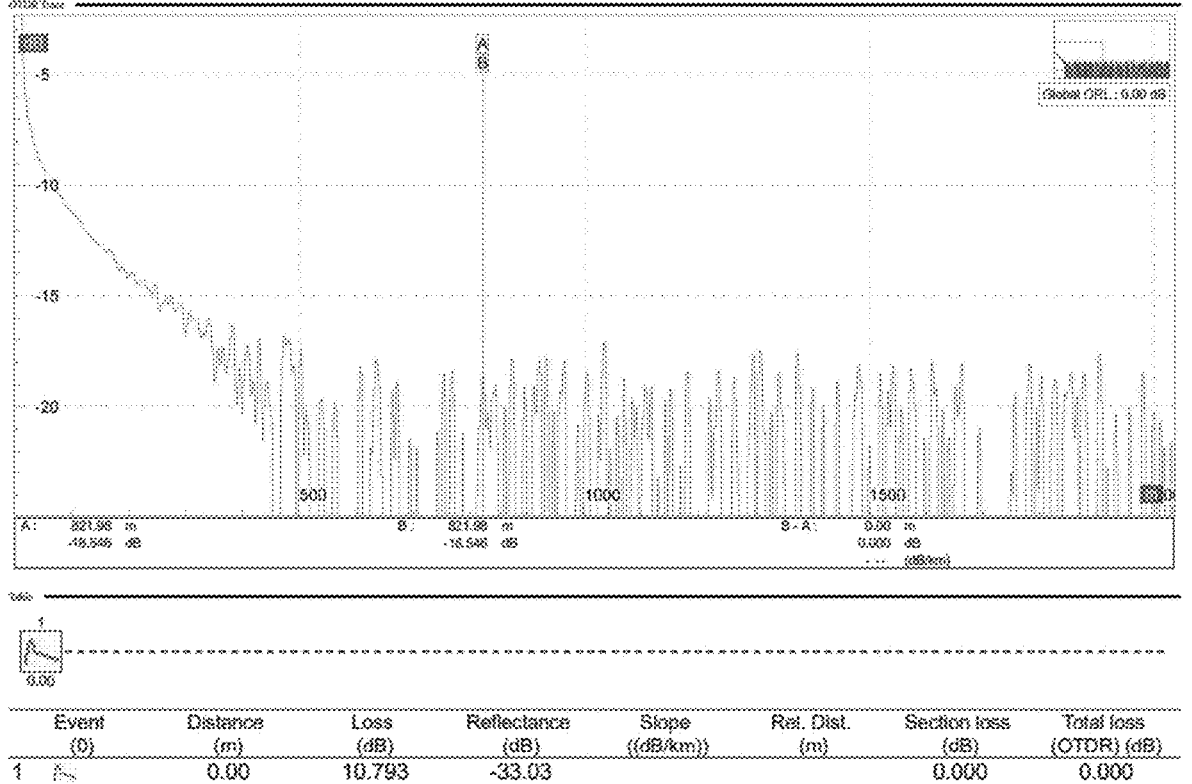

FIG. 5 is an example OTDR trace of the fiber that was taken with BS enabled. There is a clearly demarcated reflection event at a distance of 1.146 km, which is near the far end of the fiber. By contrast, FIG. 6 is an example OTDR trace of the fiber that was taken with BS disabled. No reflection event is discernible.

Factors influencing the response time of the BS control may include the type of optical gate used to control the sensing of backscatter, and the potential response time of the decision-making unit. By way of example, a decision made locally in the FSCD agent by a dedicated fast ASIC or FPGA can be much faster than a decision made in a distant sensing network orchestrator, because propagation delay is avoided.

To measure the BS control response time of the prototype, we provided the prototype with a fast photodetector, configured to detect OTDR pulses arriving as if from outside the network infrastructure to be protected. The photodetector was configured with a suitable power-level threshold. We set a policy in the FPGA-based FSCD local agent for sending a control signal to block BS sensing when an OTDR pulse is detected.

TABLE 1

| Optical Gate Technology | Total Delay (microseconds) |
|---|---|
| Voltage-Controlled Variable Optical Attenuator (VOA) | Less than 600 |
| Acousto-Optic Modulator (AOM) | Less than 1 |
| Semiconductor Optical Amplifier (SOA) | Less than 0.1 |

Table 1 shows a range of total response times we were able to achieve in the FSCD from the moment the pulse is detected until backpropagating light is blocked. Each row of the table relates to a different technology for the optical gate, which is, respectively, VOA, AOM, and SOA. We note that for the implementation reported here, a VOA attenuation above 25 dB was deemed sufficient.

We evaluated the polarization scrambler in the prototype device for its ability to hide SoP-detectable events in a mechanical frequency range of interest. As a general rule, care is needed in defining the polarization scrambling rate, in order to minimize the possible impact on dual-polarization coherent transmissions. However, the mechanical frequencies of interest for SoP sensing are typically well below the SoP tracking capacity of coherent transceivers.

We used a robotic arm to test the effectiveness of the SoP sensing control mechanism. When SoP sensing was enabled, we could clearly distinguish when the robot arm moved the fiber from the static state. When SoP was disabled by activating the polarization scrambler, however, it became very difficult to perceive the disturbance.

Figures 7, 8, 9, 10:
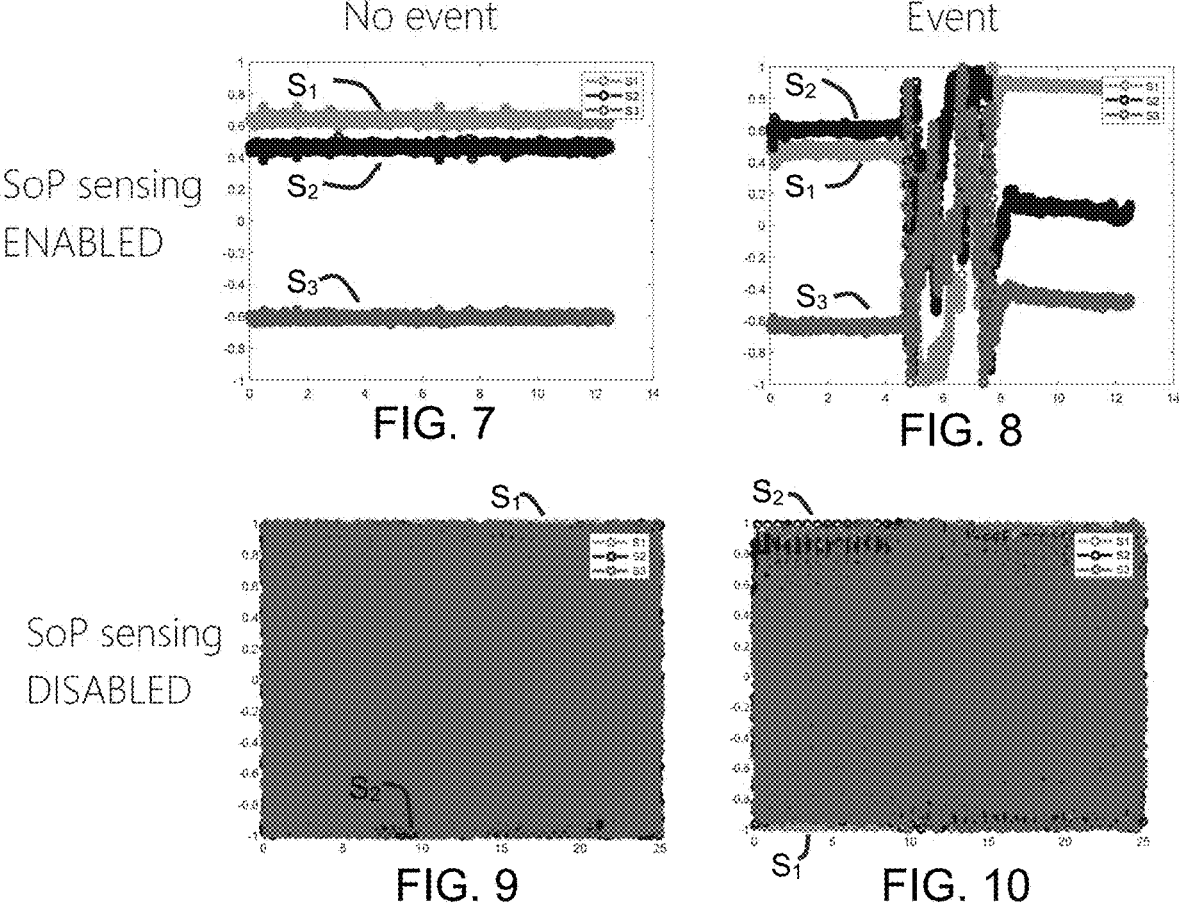
FIGS. 7 and 8 are example polarimeter traces that were taken in experimental trials of a prototype FSCD with a polarization control unit, including a polarization scrambler. The traces were taken with SoP sensing enabled by the FSCD. The trace of FIG. 7 was taken in the absence of any disturbing mechanical event. The trace of FIG. 8 shows the effect of a disturbing mechanical event.
FIGS. 9 and 10 are example polarimeter traces that were taken in experimental trials of a prototype FSCD with a polarization scrambler. The traces were taken with SoP sensing disabled. The trace of FIG. 9 was taken in the absence of any disturbing mechanical event. The trace of FIG. 10 was taken during a disturbing mechanical event.

FIGS. 7 and 8 are polarimeter traces showing the Stokes polarization parameters $S_1$, $S_2$, and $S_3$ as measured in the optical fiber when SoP sensing is enabled. The trace of FIG. 7 was taken in the absence of any disturbing mechanical event. The trace of FIG. 8 shows the effect of a disturbing mechanical event. The disturbance is clearly visible in the deflection of all three Stokes parameters.

FIGS. 9 and 10 are polarimeter traces showing the Stokes polarization parameters $S_1$, $S_2$, and $S_3$ as measured in the optical fiber when SoP sensing is disabled. The trace of FIG. 9 was taken in the absence of any disturbing mechanical event. In the measurements of both FIG. 9 and FIG. 10, the three Stokes parameters were all randomly varying in a fast manner, so that no meaningful information was discernible. The parameter $S_3$ was the last parameter to be plotted in both figures, causing it to dominate the plot although in fact the plots of all three parameters were similarly spread across the screen.

I claim:

1. A system comprising at least a first of one or more network segments, wherein at least the first network segment comprises:

a network infrastructure (105);

at least one optical fiber cable (115, 120) communicatively connected to the network infrastructure; and one or more fiber sensing control devices (FSCDs) (100) for control of fiber sensing of the first network segment;

wherein:

each of the FSCDs is located on a respective one of the optical fiber cables at a boundary between the first network segment and a region of said respective one of the optical fiber cables that is vulnerable to fiber sensing;

each of the FSCDs is dedicated for the purpose of controlling the fiber sensing on at least one fiber (115, 120) of its respective optical fiber cable; and each of the FSCDs comprises at least one blocking element (125, 130, 240) that is controllable to block sensing of backscattered light on at least one fiber under control of said FSCD by blocking injected fiber-sensing probe pulses from entering the first network segment from the vulnerable region, and/or by blocking fiber-sensing backscattered light from entering the vulnerable region from the first network segment.

2. The system of claim 1, wherein the at least one blocking element comprises an optical isolator (125, 130).

3. The system of claim 2, wherein at least the first one of the FSCDs further comprises an SoP unit (310) comprising a polarization scrambler on at least one fiber under control of said FSCD.

4. The system of claim 1, wherein at least one of the FSCDs comprises a local control unit (205, 300) for activating and deactivating its at least one blocking element (125, 130, 240).

5. The system of claim 1, wherein at least a first one of the FSCDs comprises, on each fiber under control of said FSCD:
a pass-through path (210, 255, 220, 225) for communication signals;
a bypass path (235, 245) for backscattered signals; and
an optical gate (240) for controllably allowing and blocking the backscattered signals.

6. The system of claim 5, wherein at least the first one of the FSCDs further comprises:
a local control unit (205, 300) for opening and closing the optical gate; and
a diversion path (255, 260) for diverting, to the local control unit, a portion of communication signals that enter said FSCD.

7. The system of claim 6, wherein the local control unit (205) is configured to detect a command signal in the diverted signal portion, and to respond to the command signal by activating the optical gate to open or close.

8. The system of claim 6, wherein the local control unit (300) is configured to detect a signal pattern indicative of an intrusion attempt in the diverted signal portion, and to respond to the detected pattern by activating the optical gate to close.

9. The system of claim 6, wherein:
at least the first one of the FSCDs further comprises a real-time sensing agent (305);
the real-time sensing agent is configured to detect intrusion attempts; and
the real-time sensing agent is further configured to respond to a detected intrusion attempt by sending an activation signal to the controller (300).

10. The system of claim 6, wherein:
the FSCD further comprises an SoP unit (310) comprising a polarization scrambler and a controller for the polarization scrambler on at least one fiber under control of said FSCD; and
the real-time sensing agent (305) is further configured to respond to a detected intrusion attempt by sending an activation signal to the controller of the SoP unit to activate the polarization scrambler.

11. The system of claim 1, wherein:
the system comprises a plurality of network segments (410), each of which is protected by one or more FSCDs (405) that collectively constitute an FSCD plurality;
each FSCD of the FSCD plurality controls fiber sensing on at least one fiber (115, 120) of a respective optical fiber cable;
each FSCD of the FSCD plurality comprises, on each fiber under its control, a pass-through path (210, 255, 220, 225) for communication signals, a bypass path (235, 245) for backscattered signals; and at least one optical gate (240) for controllably allowing and blocking the backscattered signals;
each FSCD of the FSCD plurality further comprises a local control unit (205, 300) for opening and closing its respective at least one optical gate; and
each of the network segments of the network-segment plurality further comprises a sensing network controller (415) configured to send control signals to the respective local control units (205, 300) of the FSCDs belonging to that network segment.

12. The system of claim 11, further comprising a sensing network orchestrator (420), wherein:
the sensing network orchestrator is communicatively connected to the sensing network controller (415) of each of the network segments (410) of the network-segment plurality;
the sensing network orchestrator is configured to orchestrate control of the FSCDs across the plurality of network segments; and
each sensing network controller (415) is configured to send control signals to the respective local control units (205, 300) of the FSCDs belonging to its respective network segment in response to orchestration signals that it receives from the sensing network orchestrator.

13. A method of permissively controlling fiber sensing of a network infrastructure (105) situated within at least a first network segment of a communication network, comprising activating at least one fiber-sensing control device (FSCD) (100) located on a respective optical fiber cable at a boundary between the first network segment and a neighboring network segment in a region of said respective optical fiber cable that is vulnerable to fiber sensing, wherein:
the at least one FSCD is dedicated for the purpose of controlling fiber sensing on one or more fibers (115, 120) of its respective optical fiber cable; and
the activating of the at least one FSCD comprises causing each of one or more blocking elements (125, 130, 240) to block sensing of backscattered light on one or more fibers under control of said at least one FSCD by blocking injected fiber-sensing probe pulses from entering the first network segment from the vulnerable region, and/or by blocking fiber-sensing backscattered light from entering the vulnerable region from the first network segment.

14. The method of claim 13, wherein the activating of the at least one FSCD comprises activating an optical isolator (125, 130).

15. The method of claim 14, wherein the activating of the at least one FSCD further comprises activating a polarization scrambler on one or more fibers under control of said FSCD.

16. The method of claim 14, wherein the activating of the at least one FSCD comprises causing an optical gate (240) to close so as to block backscattered signals from entering one or more fibers under control of said FSCD.

17. The method of claim 16, wherein:
the method further comprises diverting at least a portion of communication signals entering the at least first one of the FSCDs to a local control unit (205) configured to detect a command signal in the diverted signal portion; and
the causing of an optical gate (240) to close is performed in response to detection of a command signal in the diverted signal portion.

18. The method of claim 16, wherein:
the method further comprises diverting at least a portion of communication signals entering the at least first one of the FSCDs to a local control unit (300) configured to detect a signal pattern indicative of an intrusion attempt in the diverted signal portion; and
the causing of an optical gate (240) to close is performed in response to detection of a signal pattern indicative of an intrusion attempt in the diverted signal portion.

19. The method of claim 18, further comprising activating a polarization scrambler on one or more fibers under control of said at least one FSCD in response to detection of a signal pattern indicative of an intrusion attempt in the diverted signal portion.

20. The method of claim 13, wherein:

the communication network comprises a plurality of network segments (410), each of which is protected by one or more FSCDs (405) that collectively constitute an FSCD plurality;

each FSCD of the FSCD plurality controls fiber sensing on at least one fiber (115, 120) of a respective optical fiber cable;

each FSCD of the FSCD plurality comprises a local control unit (205, 300) for activating and deactivating its respective at least one blocking element;

each of the network segments of the network-segment plurality further comprises a sensing network controller (415) configured to send control signals to the respective local control units (205, 300) of the FSCDs belonging to that network segment;

the activating of the at least one FSCD comprises sending one or more first control signals from a sensing network orchestrator (420), and sending one or more second control signals from at least one sensing network controller (415);

the first control signals are sent from the sensing network orchestrator to the sensing network controllers (415) of selected networks;

the second control signals are sent by the sensing network controllers of the selected networks in response to the first control signals;

each second control signal is sent by a sensing network controller to the local control unit of each of one or more FSCDs within the sensing network controller's own network segment; and each local control unit responds to a received second control signal by activating a respective blocking element.

\* \* \* \* \*